(12) United States Patent
Stewart et al.

(10) Patent No.: US 6,550,096 B1
(45) Date of Patent: Apr. 22, 2003

(54) BEAM BLADE WIPER ASSEMBLY HAVING IMPROVED COUPLER

(75) Inventors: Jeffrey Stewart, Lake Orion, MI (US); William Young, III, Southfield, MI (US)

(73) Assignee: Trico Products Corporation, Rochester Hills, MI (US)

( * ) Notice: Subject to any disclaimer, the term of this patent is extended or adjusted under 35 U.S.C. 154(b) by 411 days.

(21) Appl. No.: 09/611,189

(22) Filed: Jul. 6, 2000

(51) Int. Cl.$^7$ .................................................. B60S 1/40

(52) U.S. Cl. .................................. 15/250.32; 15/250.43

(58) Field of Search ........................ 15/250.32, 250.43, 15/250.44, 250.351, 250.361

(56) References Cited

U.S. PATENT DOCUMENTS

| | | | | |
|---|---|---|---|---|
| 2,589,339 A | | 3/1952 | Carson ........................ 15/245 |
| 2,616,112 A | * | 11/1952 | Smulski ................... 15/250.32 |
| 2,643,411 A | * | 6/1953 | Nesson ..................... 15/250.32 |
| 2,801,436 A | | 8/1957 | Scinta .......................... 15/245 |
| 2,932,843 A | * | 4/1960 | Zaiger et al. ............. 15/250.32 |
| 2,946,078 A | * | 7/1960 | Deibel et al. ............. 15/250.32 |
| 3,029,460 A | | 4/1962 | Hoyler ..................... 15/250.44 |
| 3,104,412 A | | 9/1963 | Hinder ..................... 15/250.42 |
| 3,132,367 A | | 5/1964 | Wise ........................ 15/250.42 |
| 3,147,507 A | * | 9/1964 | Glynn ...................... 15/250.32 |
| 3,192,551 A | | 7/1965 | Appel ...................... 15/250.36 |
| 3,480,986 A | | 12/1969 | Forster .................... 15/250.36 |
| 3,588,942 A | | 6/1971 | Schlesinger .............. 15/250.32 |
| 3,751,754 A | | 8/1973 | Quinian et al. .......... 15/250.32 |
| 3,780,395 A | | 12/1973 | Quinian et al. .......... 15/250.36 |
| 3,872,537 A | | 3/1975 | Bianchi ................... 15/250.42 |
| 3,881,214 A | | 5/1975 | Palu ........................ 15/250.42 |

(List continued on next page.)

FOREIGN PATENT DOCUMENTS

| | | | |
|---|---|---|---|
| DE | 2 311 293 | 9/1974 | |
| DE | 23 36 271 | 2/1975 | |
| DE | 23 50 302 | 4/1975 | |
| DE | 23 53 368 | 5/1975 | |
| DE | 197 34 843 A1 | 2/1999 | |
| DE | 198 14 609 A1 | 10/1999 | |
| FR | 1069875 | * 2/1954 | ............. 15/250.32 |
| FR | 2515121 | 4/1983 | |
| GB | 878951 | * 10/1961 | ............. 15/250.32 |
| GB | 1 012 902 | 12/1965 | |
| GB | 1 395 918 | 5/1975 | |
| GB | 2 308 542 A | 7/1997 | |

*Primary Examiner*—Gary K. Graham
(74) *Attorney, Agent, or Firm*—Bliss McGlynn, P.C.

(57) ABSTRACT

A beam blade windshield wiper assembly having an elongated backbone defining a longitudinal beam length which extends between first and second longitudinal ends so as to define a longitudinal axis with an intermediate portion therebetween. The backbone has an upper surface and an opposed mounting surface with first and second sides extending between the upper surface and the mounting surface. A wiper element is mounted to the mounting surface of the backbone and extends for a substantial portion of its longitudinal beam length. The assembly further includes a coupler which is adapted to interconnect the backbone to a wiper arm. The coupler includes a spring clip mounted to the backbone and a coupler housing adapted to be mounted to the wiper arm. The spring clip includes a base supported on the upper surface of the backbone, a spring seat disposed spaced from the upper surface of the backbone and a spring biased tongue extending in the direction of the longitudinal beam length and disposed spaced from the upper surface of the backbone. The coupler housing defines a cavity and has a pivot pin extending across the cavity and transverse to the longitudinal beam length. The pivot pin is rotatably received and supported between the spring seat and the tongue with the tongue biasing the pin into engagement with the spring seat.

20 Claims, 5 Drawing Sheets

U.S. PATENT DOCUMENTS

| | | | |
|---|---|---|---|
| 4,028,770 A | 6/1977 | Appel | 15/250.42 |
| 4,063,328 A | 12/1977 | Arman | 15/250.42 |
| 4,102,003 A | 7/1978 | Hancu | 15/250.42 |
| 4,127,916 A | 12/1978 | van der Berg et al. | 15/250.42 |
| 4,339,839 A | 7/1982 | Knights | 15/250.04 |
| 4,343,063 A | 8/1982 | Batt | 15/250.42 |
| 4,587,686 A | 5/1986 | Thompson | 15/250.42 |
| 4,807,326 A | 2/1989 | Arai et al. | 15/250.42 |
| 5,062,176 A | 11/1991 | Unterborn et al. | 15/250.23 |
| 5,307,536 A | 5/1994 | Lescher | 15/250.42 |
| 5,325,564 A | 7/1994 | Swanepoel | 15/250.42 |
| 5,485,650 A | 1/1996 | Swanepoel | 15/250.43 |

* cited by examiner

BEAM BLADE WIPER ASSEMBLY HAVING IMPROVED COUPLER

BACKGROUND OF THE INVENTION

1. Field of the Invention

The present invention relates, generally, to windshield wiper assemblies and, more specifically, to a beam blade windshield wiper assembly having an elongated, curved backbone with an attached wiper blade and which includes a mounting coupler for quick connect and disconnect to a wiper arm.

2. Description of the Related Art

Conventional windshield wiper assemblies known in the related art include some type of blade assembly mounted to an arm which, in turn, is mounted adjacent the windshield and pivotally driven to impart reciprocating motion to the wiper blade assembly across the windshield. A rubber wiping element is supported by the blade assembly and contacts the windshield across the surface to be wiped. The wiper element often incorporates one or more metal strips which act to reinforce the wiper element and facilitate wiping contact by the element across what is typically a curved glass surface.

One type of blade assembly commonly employed in the related art includes a "tournament" style superstructure including a primary lever carried by the arm, two or more secondary levers and a series of two or more tertiary levers. The secondary levers are articulated to the primary lever at pivot points located at the opposed, lateral ends of the primary lever. Similarly, the tertiary levers are each articulated to a secondary lever at pivot points located at the opposed lateral ends of the secondary levers. As noted above, the blade assembly is located on the end of the wiper arm and represents a significant portion of the inertia generated by the wiping system when in operation. Furthermore, the profile of the blade assembly as it is reciprocated across the windshield is an important design consideration with respect to avoiding wind lift at higher vehicle speeds. In addition, since components of the windshield wiping system are often visible, even when not in operation, the aesthetic appearance of the components of the system is an important design consideration.

Beam blade type windshield wiper assemblies are also known in the art. The beam blade type windshield wiper includes an single elongated, homogeneous strip forming a spring backbone. The backbone has a connecting formation at a central position for connection to a reciprocally driven arm which applies a downward force and moves the blade assembly across the windshield. The backbone is curved along a single plane which is the same plane of curvature as that defined by the windshield. A wiper element is secured to the backbone. Examples of beam blade type windshield wipers can be found in U.S. Pat. No. 5,325,564 issued Jul. 5, 1994, and U.S. Pat. No. 5,485,650 issued Jan. 23, 1996, both in the name of Swanepoel. The beam blade backbone disclosed in the Swanepoel '650 and '564 patents is made from spring steel and generally tapers both in width and thickness from its center towards its free ends or tips. Swanepoel teaches that the thickness and width of the backbone and its radius of curvature should preferably be matched at every point along the length of the backbone so that the backbone will provide a force per unit length distribution in a longitudinal direction which increases towards both tips of the windshield wiper when the windshield wiper is in use, pressed downward intermediate its ends onto a flat surface. Beam blade wiper assemblies have the advantages of a lower profile as compared with tournament style wiper assemblies, consist of fewer parts and are considered to be aesthetically pleasing.

Coupling devices of various types have long been used to interconnect the wiper arm to the blade assembly. However, some coupling devices commonly employed for tournament style windshield wiper assemblies have suffered from the disadvantage that they are overly complex or bulky and therefore are not acceptable for use with beam blade type windshield wiper assemblies. On the other hand, the beam blade windshield wiper assemblies presently known in the art have often employed crude coupling devices which detract from the aesthetically pleasing appearance of the beam blade and do not effectively transfer the downwardly directed wiping force from the wiper arm to the backbone so that the entire wiping surface of the windshield is effectively serviced.

Accordingly, there continues to be a need in the art for a beam blade windshield wiper assembly having an improved coupling device that is aesthetically pleasing and operationally effective so as to properly distribute the wiping force from the wiper arm to the backbone. In addition, there is a need in the art for such a coupling device that has a low profile, few parts, is easy and cost-effective to manufacture as well as being easy to install.

SUMMARY OF THE INVENTION

The present invention overcomes the disadvantages in the related art in a beam blade windshield wiper assembly having an elongated backbone defining a longitudinal beam length which extends between first and second longitudinal ends so as to define a longitudinal axis with an intermediate portion therebetween. The backbone has an upper surface and an opposed mounting surface with first and second sides extending between the upper surface and the mounting surface. A wiper element is mounted to the mounting surface of the backbone and extends for a substantial portion of its longitudinal beam length. The assembly further includes a coupler which is adapted to interconnect the backbone to a wiper arm. The coupler includes a spring clip mounted to the backbone and a coupler housing adapted to be mounted to the wiper arm. The spring clip includes a base supported on the upper surface of the backbone, a spring seat disposed spaced from the upper surface of the backbone and a spring biased tongue extending in the direction of the longitudinal beam length and disposed spaced from the upper surface of the backbone. The coupler housing defines a cavity and has a pivot pin extending across the cavity and transverse to the longitudinal beam length. The pivot pin is rotatably received and supported between the spring seat and the tongue with the tongue biasing the pin into engagement with the spring seat.

One advantage of the present invention is that it provides a beam blade type windshield wiper assembly having an improved coupler which is aesthetically pleasing and is operatively effective so as to properly distribute the wiping force from the wiper arm to the backbone thereby servicing the entire surface to be wiped on the windshield.

Another advantage of the present invention is that the coupler has a low profile and few parts.

Still another advantage of the present invention is that it is easy to install employing structure which provides a quick connect and disconnect feature.

Still another advantage of the present invention is that it is cost-effective to manufacture.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT(S)

Figure 1:
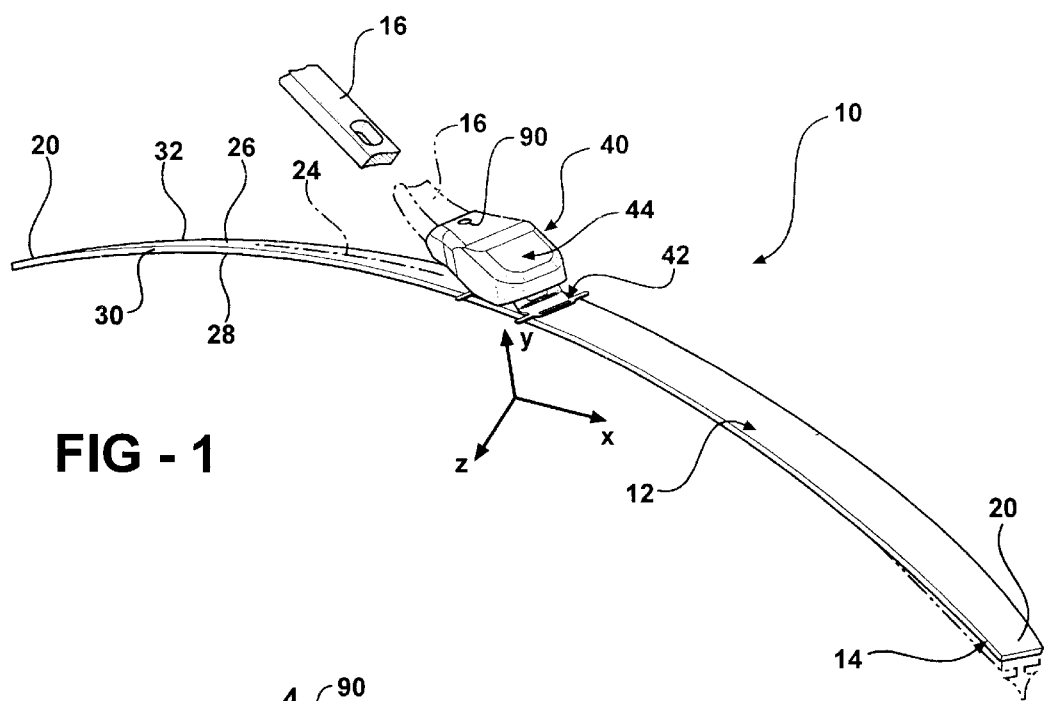
FIG. 1 is a perspective view the beam blade wiper assembly of the present invention.

Referring now to FIG. 1, a beam blade wiper assembly of the present invention is generally indicated at 10 where like numbers are used to designate like structure throughout the drawings. The beam blade wiper assembly 10 includes a backbone 12 and a wiper element 14. The beam blade windshield wiper assembly 10 is controlled and driven by a spring loaded arm, a portion of which is illustrated in phantom at 16 in FIG. 1. The beam blade windshield wiper assembly 10 is mounted adjacent the windshield (not shown) of a vehicle and pivotally driven to impart reciprocating motion to the beam blade wiper assembly 10 across the windshield, as commonly known in the art. The backbone 12 is connected to the arm 16 by a coupler, generally indicated at 40, which acts to releasably connect the wiper assembly 10 to the spring loaded wiper arm 16 as will be described in greater detail below.

The elongated backbone 12 has a longitudinal beam length extending between first and second ends 20, 22. The beam length defines a median line 24 extending along the beam length. The coupler 40 is located at an intermediate position, commonly at the longitudinal center, between the first and second longitudinal ends 20, 22. However, those having ordinary skill in the art will appreciate that the coupler can be located biased toward one end, 20, or the other, 22. The backbone 12 is made of resiliently flexible material which applies a force from the spring loaded wiper arm 16 through the coupler 40 along the backbone's length to the first and second longitudinal ends 20, 22. The backbone 12 is typically made of a single, integral piece of material. Alternatively, the backbone 12 may be formed into a single piece by laminates.

Figure 2:
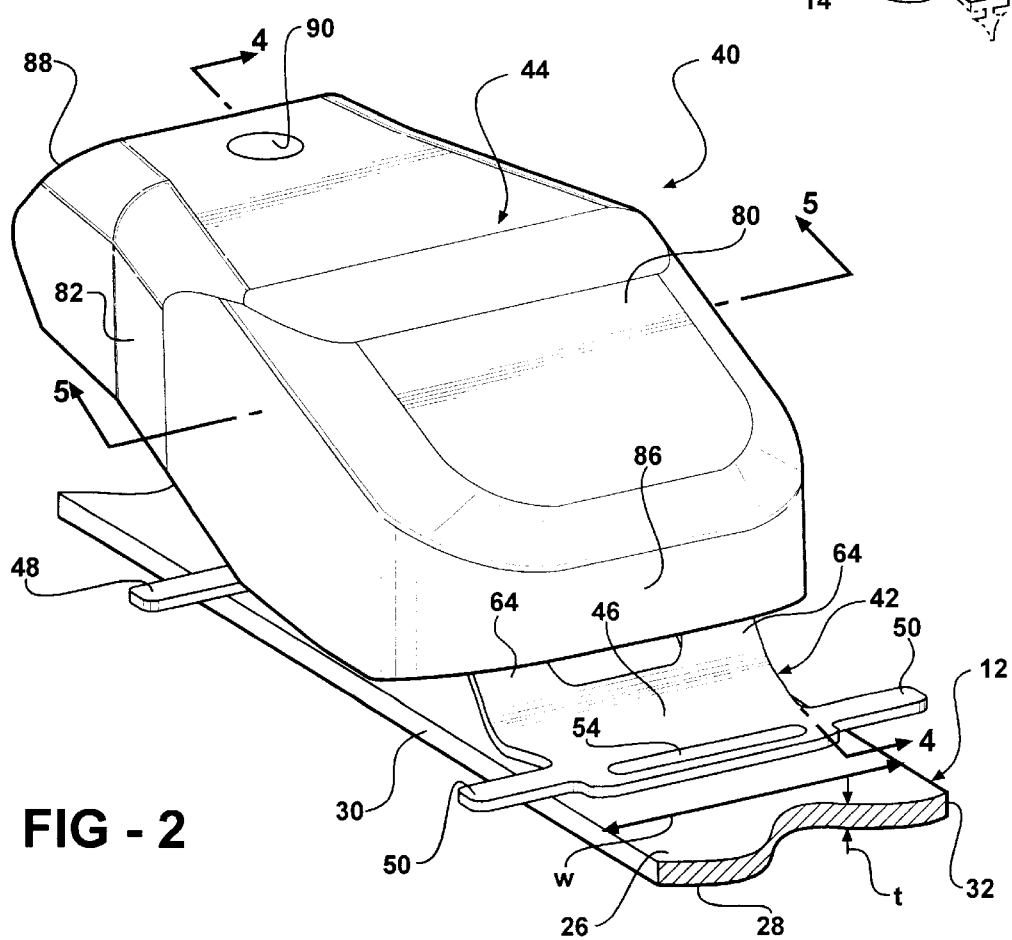
FIG. 2 is an enlarged perspective view of the coupler of the present invention.
Figure 4:
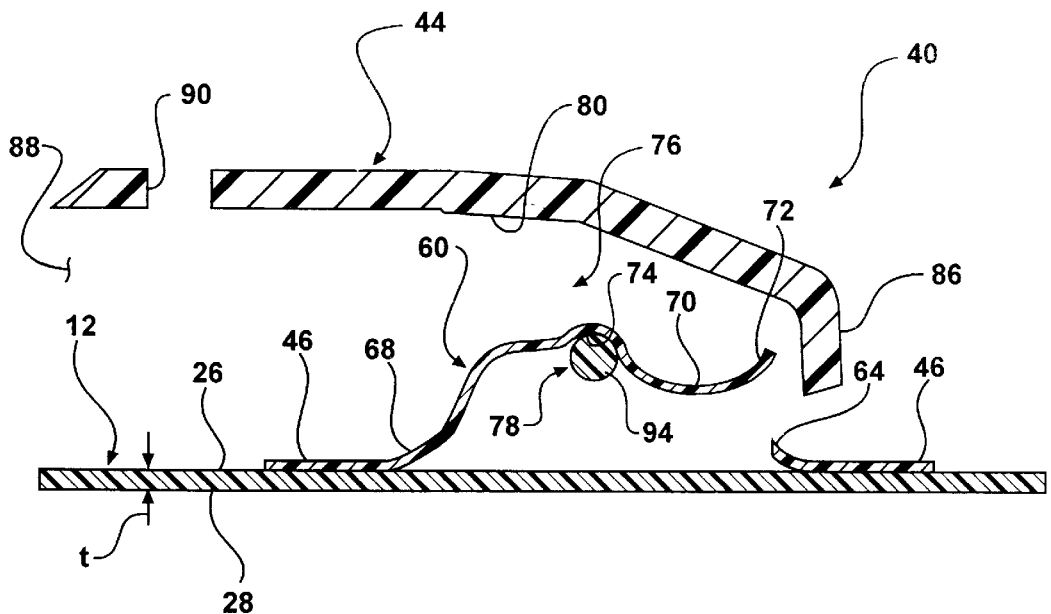
FIG. 4 is a cross section of the coupler taken along lines 4—4 of FIG. 2.

The backbone 12 includes an upper surface 26 and an opposing mounting surface 28 with first and second sides 30, 32 extending therebetween. Preferably, the wiper element 14 is mechanically attached, bonded, chemically attached, or otherwise adhered to the mounting surface 28 of the backbone 12 and extends for a substantial portion of the longitudinal beam length. The cross-section of the backbone 12 is generally rectangular making the first and second sides 30, 32 generally perpendicular to both the upper surface 26 and mounting surface 28. However, the cross-section of the backbone 12 may include any suitable geometric shape. The backbone 12 has a width "W" defined along a width line drawn between the first and second sides 30, 32 and perpendicular to the median line 24 (FIG. 2). The thickness of the backbone 12 is defined by a line t extending perpendicular to the width between the upper surface 26 and mounting surface 28 (FIGS. 2 & 4). In general, the width and thickness of the backbone may be consistent or the backbone may vary in width and/or thickness along its longitudinal length.

The backbone 12 is curved longitudinally with a predetermined free form shape or radius of curvature parallel to the plane of curvature of the windshield (hereinafter "windshield curvature"). An x-y plane is defined by a cross section taken longitudinally along the median line 24 and through the backbone 12 and wiper element 14, with the x-axis extending tangentially to the median line 24 at the center of the backbone 12 and the y-axis extending through the cross-section of the backbone 12 and wiper element 14. A z-axis extends perpendicular to the x-y plane in the direction of the width line drawn at the center or connecting portion 18. The curvature of the backbone. 12 in the x-y plane may be symmetrical or asymmetrical depending on the force requirements and the contour of the windshield. The flexible, free form, pre-curved backbone 12 flattens out, or the curvature is reduced, such that the backbone will conform when the wiper arm 16 applies a force thereto on a windshield. Thus, the backbone 12 must have adequate free-form curvature to ensure a good force distribution on windshields having various curvatures and to effect proper wrapping about the windshield.

Figure 3:
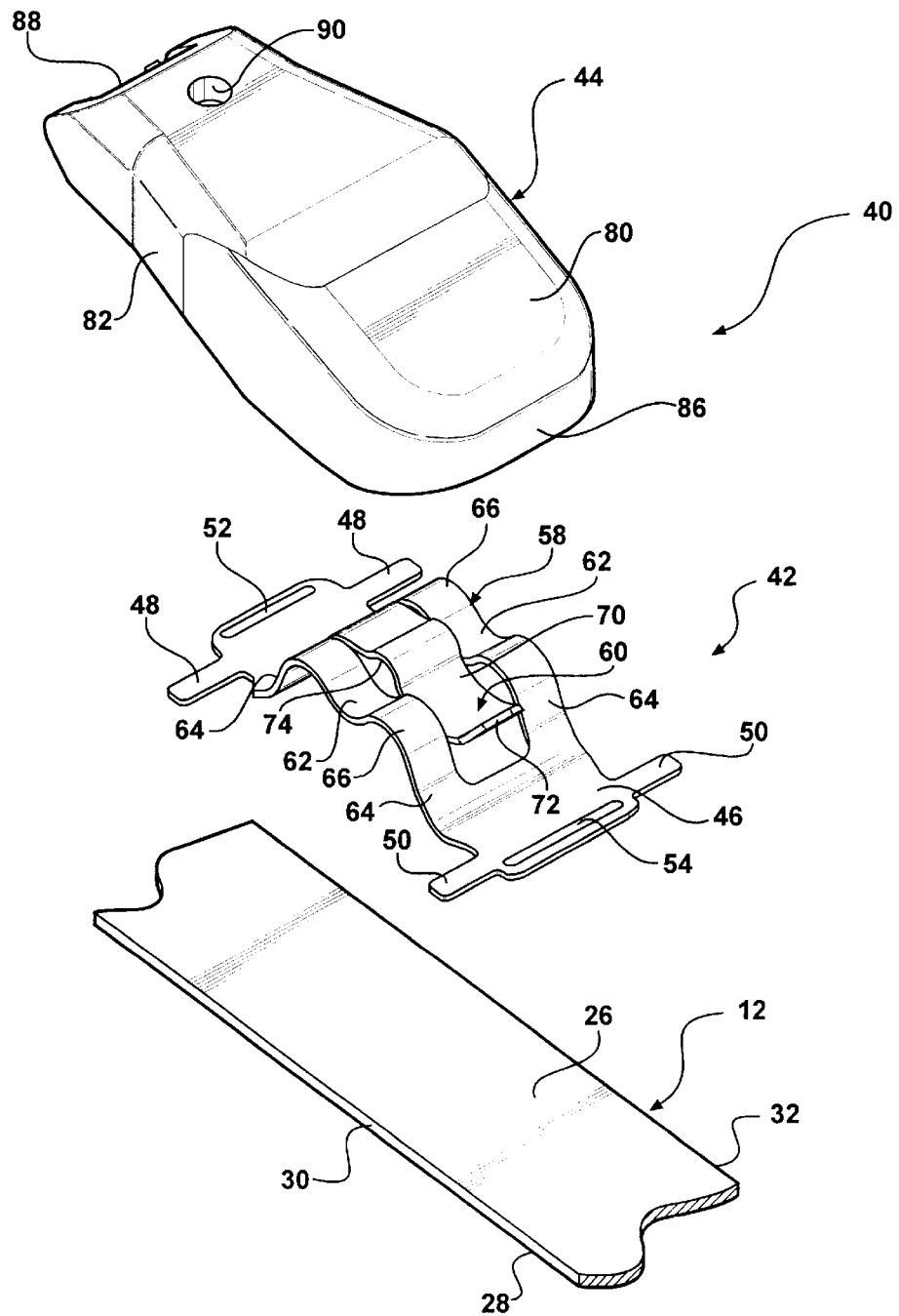
FIG. 3 is an exploded perspective view of the coupler.
Figure 5:
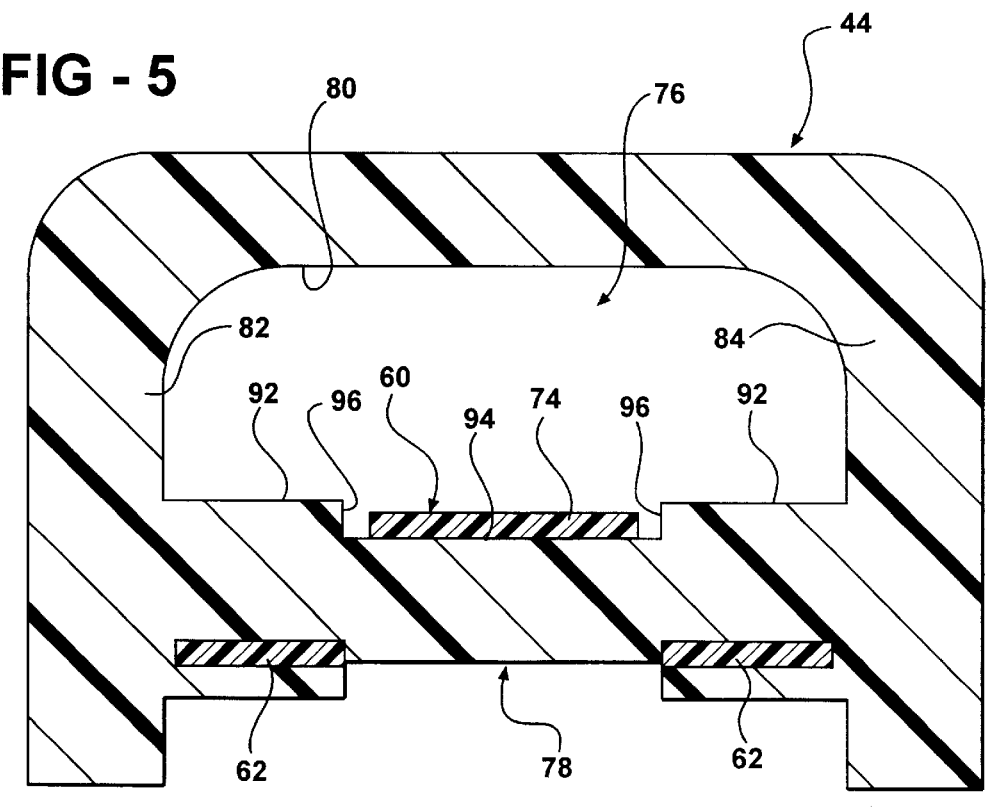
FIG. 5 is a cross section of the coupler taken along lines 5—5 of FIG. 2.
Figure 5:
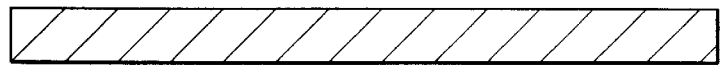
Figure 6:
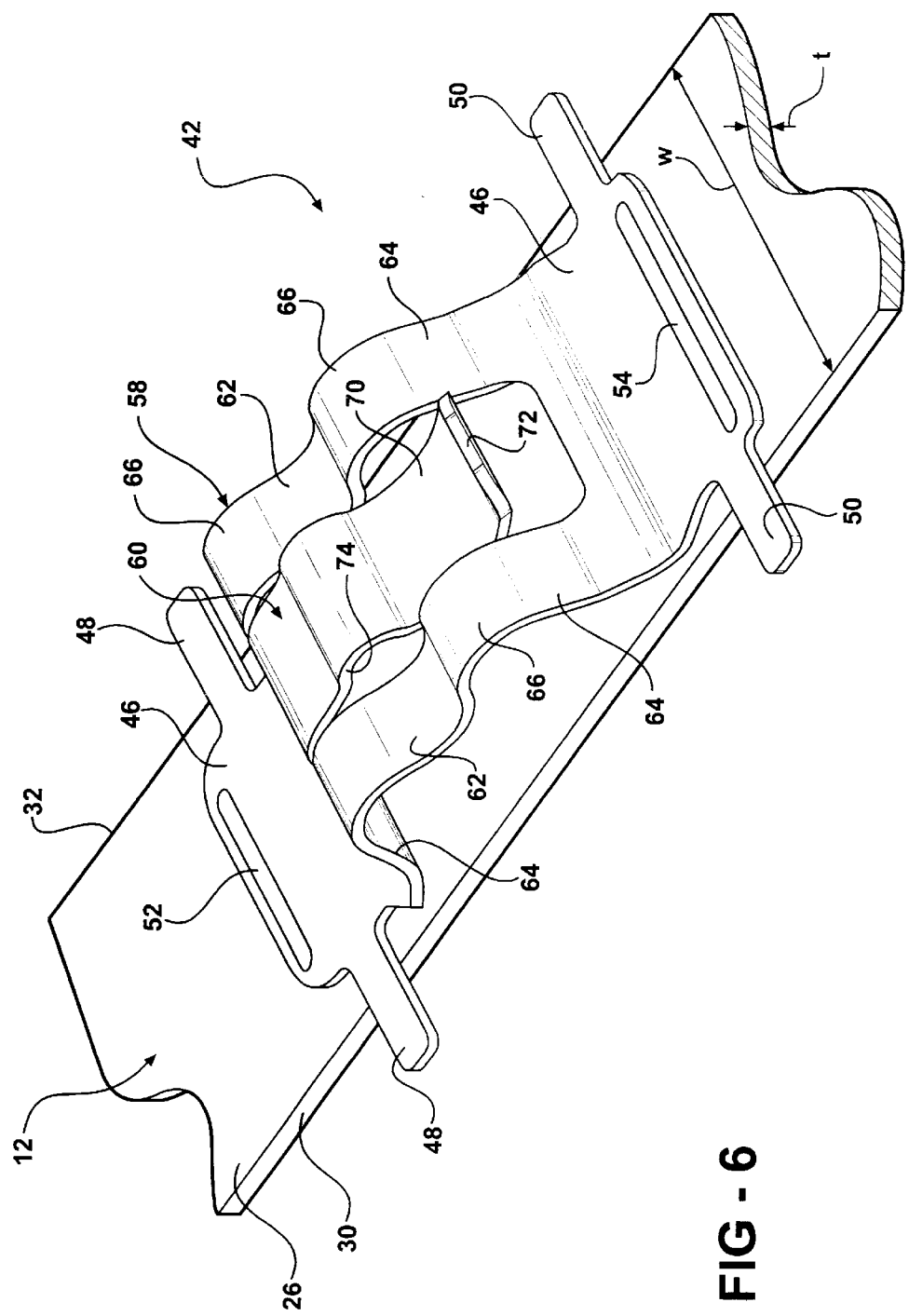
FIG. 6 is a perspective view of the spring clip on a backbone.

The coupler 40 is specifically illustrated in FIGS. 2–8, and is connected between the backbone 12 and the wiper arm 16. The coupler 40 includes a spring clip, generally indicated at 42, mounted to the backbone 12 and a coupler housing, generally indicated at 44 which is adapted to be mounted to the wiper arm 16 as will be described in greater detail below. As best shown in FIGS. 3 & 6, the spring clip 42 includes a base 46 supported on the upper surface 26 of the backbone 12. To this end, the base 46 includes a plurality of laterally extending tangs 48, 50 which are adapted to be deformable into gripping engagement with the backbone 12. In the preferred embodiment, the base includes two pair of tangs 48, 50, respectively, with each pair of tangs 48, 50 aligned upon a common axis extending transverse to the longitudinal beam length and spaced from each other on the base 46 in the direction of the longitudinal beam length. The base 46 further includes a pair of stiffening ribs 52, 54 which are disposed spaced from one another in the direction of the longitudinally extending beam length. The ribs 52, 54 extend in a direction transverse to the longitudinal beam length across a portion of the base 46. The ribs 52, 54 act to transfer forces from the wiper arm 16 to the backbone 12 of the windshield wiper assembly 10 of the present invention. As an alternative to the tangs 48, 50, or in addition thereto, the base 46 or coupler 40 may be attached to the backbone 12 via welding, adhesive bonding or any other suitable manner.

The spring clip 42 also includes a spring seat, generally indicated at 58, which is disposed spaced from the upper surface 26 of the backbone 12 and a spring biased tongue, generally indicated at 60, which extends in the direction of the longitudinal beam length and is disposed spaced from the upper surface 26 of the backbone 12 as will be described in greater detail below. The spring seat 58 includes a pair of concave saddles 62 which are located spaced from one another in a direction transverse to the longitudinal beam length. The concave saddles 62 open upwardly and in a direction away from the upper surface 26 of the backbone 12 and are resilient in a direction toward and away from the upper surface 26. The saddles 62 are disposed between a pair of support legs 64 which extend toward one another from opposite sides of the base 46 of the spring clip 42. The support legs define crests 66 which border the upwardly concave saddle 62 on either side thereof. The support legs 64 support the saddles 62 above the upper surface 26 of the backbone 12.

On the other hand, the spring biased tongue 60 is located between the pair of concave saddles 62. Referring also to FIG. 4, the tongue 60 includes a first end 68 connected at the base 46 and a second free end 70 having a tongue flange or extension 72 extending outwardly in cantilevered fashion in the direction of the x-axis. The tongue 60 includes a convex retaining portion 74 which opens in the direction of the upper surface 26 of the backbone 12 and opposite to the direction of opening of the upwardly concave saddles 62 on the spring seat 58.

With continuing reference to FIG. 4, the coupler housing 44 defines a cavity, generally indicated at 76, with a pivot pin, generally indicated at 78, extending across the cavity 76. The coupler housing 44 has a longitudinal length extending in the direction of the longitudinal length of the backbone 12 and its x-axis when in its operative mode. The pivot pin 78 extends transverse to the longitudinal axis and in the direction of the z-axis. The cavity 76 is defined by an upper cavity wall 80 with a pair of substantially parallel sides 82, 84 extending toward the backbone 12. The coupler housing 44 also includes a front wall 86, while the rear 88 of the coupler housing 44 is adapted to receive the wiper arm 16. The pivot pin 78 is spaced from the upper cavity wall 80. The upper cavity wall 80 includes a connection formation 90 for attachment to the wiper arm 16. In the preferred embodiment illustrated in the Figures, the connection formation 90 is an aperture for receiving a fastener therethrough for connection to the wiper arm 16. The upper cavity wall 80 has a generally arcuate longitudinal cross section as illustrated in FIG. 4. This facilitates the housing of the spring clip 42 along with aesthetic purposes, while allowing the coupler housing 44 to pivot with respect to the spring clip 42 about the pivot pin 78.

Figure 7:
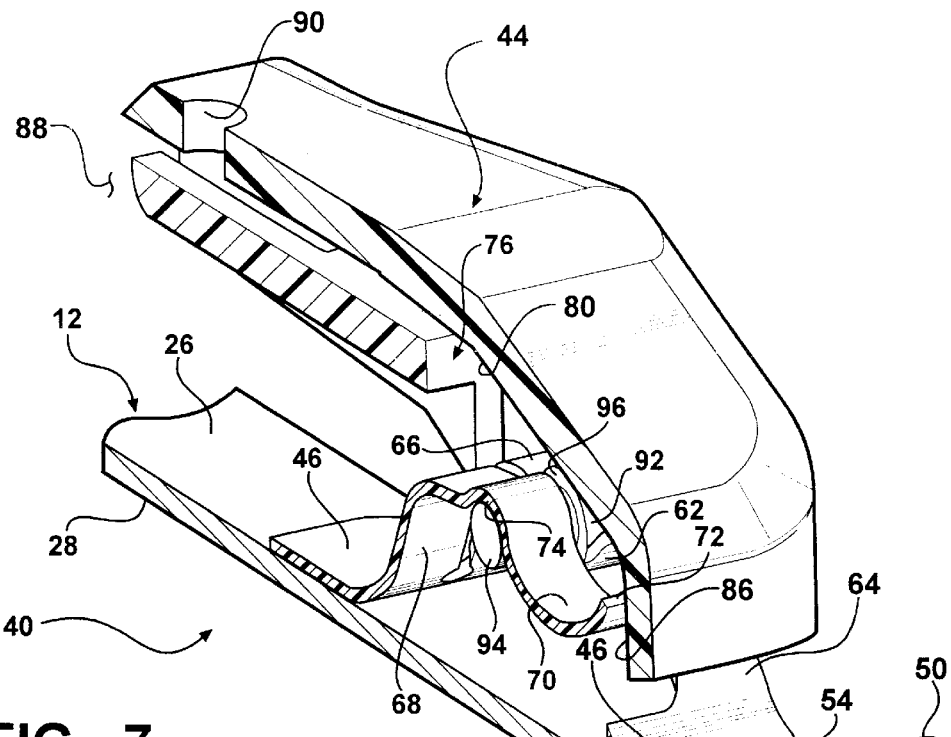
FIG. 7 is an isometric cross-sectional view of the coupler taken along lines 4—4 of FIG. 2.
Figure 8:
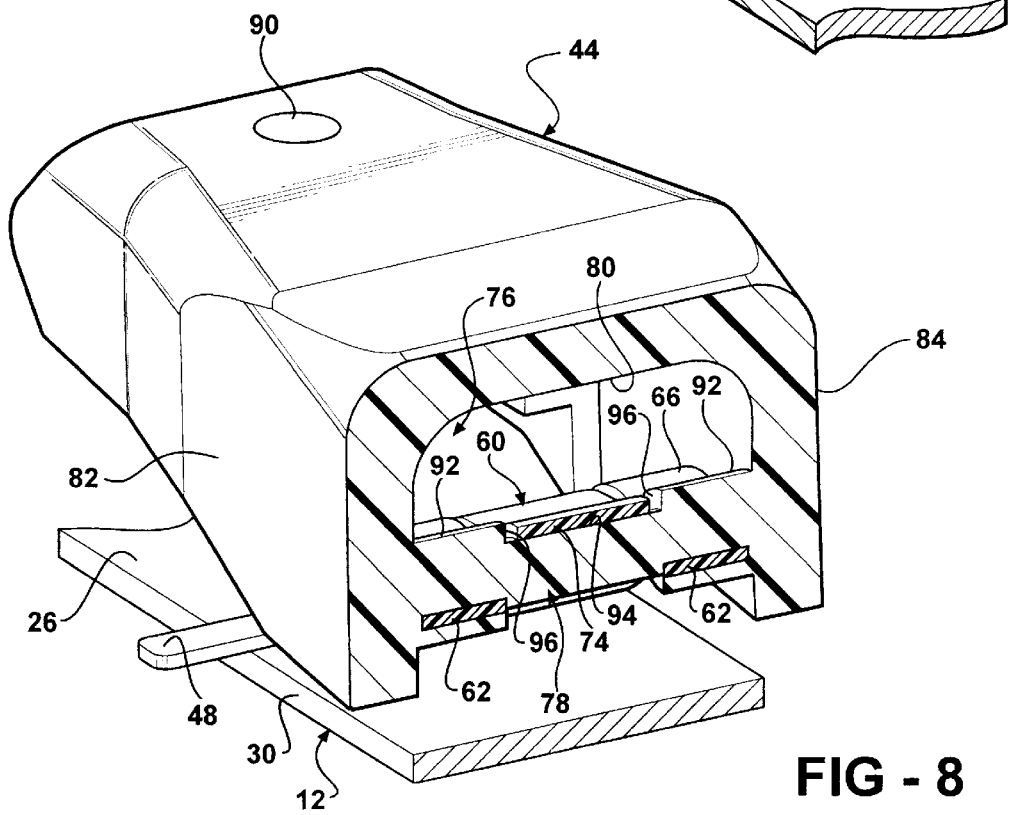
FIG. 8 is an isometric cross-sectional view taken along lines 5—5 of FIG. 2.

The pivot pin 78 is rotatably received and supported between the spring seat 58 and the tongue 60 with the tongue biasing the pin 78 into engagement with the spring seat 58. More specifically and as best shown in FIGS. 5, 7 & 8, the pin 78 includes a pair of larger diameter portions 92 which are disposed spaced from one another along an axis transverse to the longitudinal beam length. Furthermore, the pin 78 includes a reduced diameter portion 94 which is located between the pair of large diameter portions 92. Each of the pair of larger diameter portions 92 define a shoulder 96. The reduced diameter portion 94 of the pin 78 is adapted to be received in registration with the retaining portion 74 of the spring biased tongue 60. Similarly, each one of the pair of large diameter portions 92 is adapted to be received in a corresponding one of the pair of saddles 62 on the spring seat 58. In this disposition, each one of the pair of shoulders 96 defined by the large diameter portions 92 is disposed adjacent an opposite side of the tongue 60. In this way, the spring bias tongue 60 provides a retaining force against the pin 78 in the direction of the upwardly opening concave saddles 66. Also, within this configuration, shoulders 96 provide a means to reduce blade "fishtailing and judder" by providing lateral rigidity by minimizing the clearance between 96 and the wall of the tongue 74, thus limiting the ability of the beam to pivot about the Z-axis In the preferred embodiment, the coupler housing 44 and the pivot pin 78 are integrally molded together and may be made of plastic. However, the pivot pin 78 can also be an insert/overmolded steel pin (or suitable bearing material) encapsulated with plastic or other suitable material. Spring clip 42 is generally formed of an integral member made of steel.

In operation, the coupler housing 44 is secured to the wiper arm 16 and the spring clip 42 is secured to the backbone 12. The wiper arm 16 extends into the cavity 76 and is secured by a fastener through the opening 90. The coupler 40 allows for quick connect and disconnect of the coupler housing 44 to the spring clip 42. More specifically, the pivot pin 78 of the coupler housing 44 is engaged under the second, free end 70 of the tongue 60. The backbone 12 is then urged along its longitudinal axis to further engage the pivot pin 78 under the tongue 60. This movement raises the second, free end 70 of the tongue 60 allowing the pivot pin 78 to move into registration with the saddles 62. When the pivot pin 78 settles in the saddles 62, the tongue 60 will lower along its bias and secure the pivot pin 78 in the saddles 62 via pressure exerted by the retaining portion 74 thereby securing the coupler housing 44 to the spring clip 42 and backbone 12. The coupler housing 44 can then pivot about the pivot pin 78 as necessary. The coupler 40 of the present invention allows pivoting movement about the pin up to approximately 55°. The downward force of the wiper arm 16 is transferred from the pivot pin 78 to the spring clip 42. The wiper arm downward force is distributed to the backbone 12 via the stiffening ribs 52, 54 on the base 46 and then ultimately to the wiper element 14 as it is reciprocated across the windshield 11.

To disconnect the coupler 40 from the backbone 12, a force is applied to the backbone 12 along its longitudinal axis in the direction of the heel of the blade 20 thereby sliding the spring clip 42 off the pin 78. The force is necessary to operate against the spring bias of the retaining portion 74 of the tongue 60 to raise the tongue 60 allowing the pivot pin 78 to slide out of registration with the saddles 62 and over the crests 66 on the legs 64.

Thus, the present invention provides a beam blade type windshield wiper assembly 10 having an improved coupler 40 which is aesthetically pleasing and is operatively effective so as to properly distribute the wiping force from the wiper arm 16 to the backbone 12 thereby servicing the entire surface to be wiped on the windshield. Furthermore, the coupler 40 has a low profile and few parts. The coupler 40 is easy to install employing structure which provides a quick connect and disconnect feature. Finally, the coupler 40 of the present invention is cost-effective to manufacture.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A beam blade windshield wiper assembly comprising:
an elongated backbone having a longitudinal beam length extending between first and second longitudinal ends of said backbone defining a longitudinal axis with an intermediate portion therebetween, an upper surface and an opposed mounting surface with first and second backbone sides extending between said upper surface and said mounting surface;

a wiper element mounted to said mounting surface of said backbone and extending for a substantial portion of said longitudinal beam length;

a coupler adapted to interconnect said backbone to a wiper arm, said coupler including a spring clip mounted to said backbone and a coupler housing adapted to be mounted to the wiper arm, said spring clip including a base supported on said upper surface of said backbone, a spring seat disposed spaced from said upper surface of said backbone and a spring biased tongue-extending in the direction of said longitudinal beam length and disposed spaced from said upper surface of said backbone, said coupler housing defining a cavity and having a pivot pin extending across said cavity and transverse to said longitudinal beam length;

said pivot pin being rotatably received and supported between said spring seat and said tongue with said tongue biasing said pin into engagement with said spring seat.

2. A beam blade windshield wiper assembly as set forth in claim 1 wherein said spring seat includes a pair of concave saddles disposed spaced from one another in a direction transverse to said longitudinal beam length, said concave saddles opening upwardly and in a direction away from said upper surface of said backbone, said spring biased tongue disposed between said pair of concave saddles and capable of providing a retaining force against said pin in the direction of said upwardly opening concave saddles.

3. A beam blade windshield wiper assembly as set forth in claim 2 wherein each of said saddles is disposed between a pair of support legs extending toward one another from opposite sides of said base of said spring clip and supporting said saddles above said upper surface of said backbone.

4. A beam blade windshield wiper assembly as set forth in claim 3 wherein said pair of upwardly opening concave saddles are resilient in a direction toward and away said upper surface of said backbone.

5. A beam blade windshield wiper assembly as set forth in claim 2 wherein said spring biased tongue includes a convex retaining portion opening in the direction of said upper surface of said backbone and opposite to the direction of opening of said upwardly concave saddles on said spring seat, a portion of said pin being received in said retaining portion of said tongue and said retaining portion acting to bias said pin into engagement with said pair of saddles.

6. A beam blade windshield wiper assembly as set forth in claim 5 wherein said tongue includes first and second ends, said first end is secured to said base and said second end includes a tongue flange extending outwardly in cantilevered fashion from said base and acts to guide said pivot pin into said saddles and said tongue retaining portion to operatively connect the wiper arm to said backbone.

7. A beam blade windshield wiper assembly as set forth in claim 5 wherein said pin includes a pair of larger diameter portions disposed spaced from one another along an axis transverse to said longitudinal beam length and a reduced diameter portion disposed between said pair of large diameter portions, each of said pair of large diameter portions defining a shoulder, said reduced diameter portion of said pin adapted to be received in registration with said retaining portion of said spring biased tongue and each one of said pair of large diameter portions being adapted to be received in a corresponding one of said pair of saddles on said spring seat such that each one of said pair of shoulders is defined by said large diameter portions is disposed adjacent an opposite side of said tongue.

8. A beam blade windshield wiper assembly as set forth in claim 1 wherein said base includes a plurality of laterally extending tangs which are adapted to be deformable into gripping engagement with said backbone.

9. A beam blade windshield wiper assembly as set forth in claim 8 wherein said plurality of tangs includes two pair of tangs which each of said pair of tangs aligned upon a common axis extending transverse to said longitudinal beam length and spaced from each other on said base in the direction of said longitudinal beam length.

10. A beam blade windshield wiper assembly as set forth in claim 1 wherein said base includes a pair of stiffening ribs disposed spaced from one another in the direction of said longitudinally extending beam length and extending in a direction transverse to said longitudinal beam length across a portion of said base, said ribs acting to transfer forces from the wiper arm to said backbone of said windshield wiper assembly.

11. A beam blade windshield wiper assembly as set forth in claim 1 wherein said cavity of said coupler housing is formed by an outer base with a pair of substantially parallel housing sides extending toward said backbone, said pivot pin connected between said housing sides and spaced from said outer base.

12. A beam blade windshield wiper assembly as set forth in claim 11 wherein said outer base includes a connection formation for attachment to the wiper arm.

13. A beam blade windshield wiper assembly as set forth in claim 12 wherein said connection formation includes an aperture through said outer base.

14. A beam blade windshield wiper assembly as set forth in claim 1 wherein said coupler housing and said pivot pin are integrally molded together.

15. A beam blade windshield wiper assembly as set forth in claim 14 wherein said coupler housing is an integral member made of plastic.

16. A beam blade wiper assembly as set forth in claim 15 further characterized by said connecting portion being located at said longitudinal center of said backbone.

17. A beam blade windshield wiper assembly as set forth in claim 1 wherein said backbone defines an X-axis extending in the direction of said longitudinal beam length tangential to said center, a Y-axis extending transverse to said X-axis and through said upper surface and said mounting surface so as to define an X-Y plane and a Z-axis extending perpendicular to said X-Y plane; and said backbone being curved in the X-Y plane.

18. A beam blade wiper assembly as set forth in claim 17 further characterized by the backbone being comprised of a unibody member.

19. A beam blade windshield wiper assembly as set forth in claim 1 wherein said spring clip is an integral member made of spring steel.

20. A beam blade windshield wiper assembly as set forth in claim 1 wherein said spring clip is attached to said beam via welding.

* * * * *